US006510878B1

(12) United States Patent
Cavit

(10) Patent No.: US 6,510,878 B1
(45) Date of Patent: Jan. 28, 2003

(54) ROUTER BASEPLATE ASSEMBLY PRECISION ALIGNER AND GUIDE

(76) Inventor: Frank J. Cavit, 39016 Blacow Rd., Fremont, CA (US) 94538-1118

( * ) Notice: Subject to any disclaimer, the term of this patent is extended or adjusted under 35 U.S.C. 154(b) by 0 days.

(21) Appl. No.: 08/872,281

(22) Filed: Jun. 10, 1997

(51) Int. Cl.[7] .................................................. B27C 9/00

(52) U.S. Cl. .......................... 144/48.6; 33/489; 33/638; 33/640; 144/136.95; 144/154.5; 144/137

(58) Field of Search ............................ 144/48.6, 134.1, 144/136.95, 137, 154.5, 371, 135.2, 372; 409/180, 181, 182; 33/187, 201, 429, 483, 489–520, 613, 626, 638, 640; 83/522.11, 522.15, 522.16

(56) References Cited

U.S. PATENT DOCUMENTS 5,445,198 A * 8/1995 McCurry .................. 144/48.6
5,452,751 A * 9/1995 Engler, III et al. ........ 144/48.6
6,305,449 B1 * 10/2001 Stover ..................... 144/135.2

* cited by examiner

*Primary Examiner*—W. Donald Bray

(57) ABSTRACT

An attachable baseplate for a highspeed router which can be used with router in an upright handheld position, or in an inverted position with router suspended by same baseplate in a router table. Front edge of baseplate has cutout portion for sliding engagement and containment of a right and a left incrementally marked alignment indicator. When secured to baseplate in a predetermined position indicators show actual diameter margins of the installed cutting tool. This simplifies and makes precise the alignment of the cutting tool to the layout line of the workpiece and allowing measuring capabilities when enlarging the existing cut without the necessity of changing cutting tool. Alignment and measuring capabilities perform equally in the handheld or suspended router table mode.

6 Claims, 2 Drawing Sheets

FIG.—1

ROUTER BASEPLATE ASSEMBLY PRECISION ALIGNER AND GUIDE

FIELD OF INVENTION

This invention relates to bases for high speed routers, either upright in hand held position or inverted and suspended in a router table, and specifically to more precise control of placement of the router cutting tool.

BACKGROUND

In presenting the specification and claims it is felt that someone skilled in the art is familiar with the router related terms such as router fence, workpiece and others, therefore these items have not been shown in the formal drawings although they may be referenced in the specification and claims.

The modern high speed router is generally used in the cutting of grooves, slots, step cuts, or some decorative edge cuts. Producing these different cuts requires very careful measuring of the distance between center of the installed cutting tool and the edge of the router base that will abut a guiding device. These measurements must be transferred to either the guiding device, usually called a fence and the layout or cutting line of the workpiece. This fence may be a guide clamped to the workpiece, a router table adjustable fence, or a fence capable of being attached to the router body. All of these devices leave room for error and the devices clamped to the router are usually limited in capacity to reach the inner portions of larger wood sheets such as plywood panels. All of them usually require a test cut for accuracy before addressing the actual workpiece and none give some indication of the actual cutting tool margins.

DESCRIPTION OF PRIOR ART

Prior art leaves much to be desired in precisely placing the router cutting tool to the desired cutting line accurately. U.S. Pat. No. 4,921,023 to Pempek (1990) does show some capability of placing the cutting tool on the cutting line, but does not precisely show cutting tool margins and is limited to about 6 inches of adjustability in side movement. This would not be usable in wider sheets such as plywood. U.S. Pat. No. 5,299,609 to Wedler (1994) is a clamped on fence device with very limited edge to cut capability. All require very careful measuring and remeasuring, and usually a test cut for accuracy.

OBJECTS OF THE INVENTION

The principal object of this invention is to provide a router base device for precisely and accurately aligning the diameter margins of the installed router cutting tool to the layout or actual cutting line of the workpiece and to precisely guide the router according to this alignment.

A further object is to provide built in measuring capabilities for moving the router on the base to right or left in order to enlarge the existing cut without the necessity of changing cutting tools.

A further object is to make this device invertable and mountable in a router table while retaining the alignment and measuring capabilities.

It is also the object of this invention to make this device easy to operate, lightweight and not cumbersome, and retaining the portability of the router.

A further object of this invention is simplicity of operation such that a skilled or unskilled person can produce the grooves, slots, dadoes, and other cuts within the router capability with precision and accuracy in a timely manner.

SUMMARY OF THE INVENTION

These and other objects are addressed and accomplished in the present invention wherein the baseplate is provided with a cutout portion on the front edge for containment and engagement of a pair of indicator blocks, each with an inner primary alignment indicator and a plurality of secondary measuring indicators. Rearward projections of indicator blocks ride on upper surface of baseplate and are contained by an elongated side to side slot for passage through of a thumbscrew securing them to the baseplate in a changeable predetermined position.

Alignment of primary alignment indicators to a scrapwood reference cut of the installed cutting tool shows diameter margins of the cutting tool, and when these indicators are referenced to the layout or cutting line of the workpiece and a guiding device abutted to the edge of the routers guide baseplate a precise and accurate cut must follow.

Inverting the router suspended by the baseplate in a router table requires a minor change in procedure. Reference cuts are made with scrapwood against router table fence and primary alignment indicators on baseplate are secured to reference margins. As the router is secured to the router table and immovable the workpiece layout lines are aligned to the alignment indicators on the bottom of the indicator blocks which are now on top in the inverted position and the router table fence abutted to the workpiece.

DETAILED DESCRIPTION AND OPERATION

Figure 1:
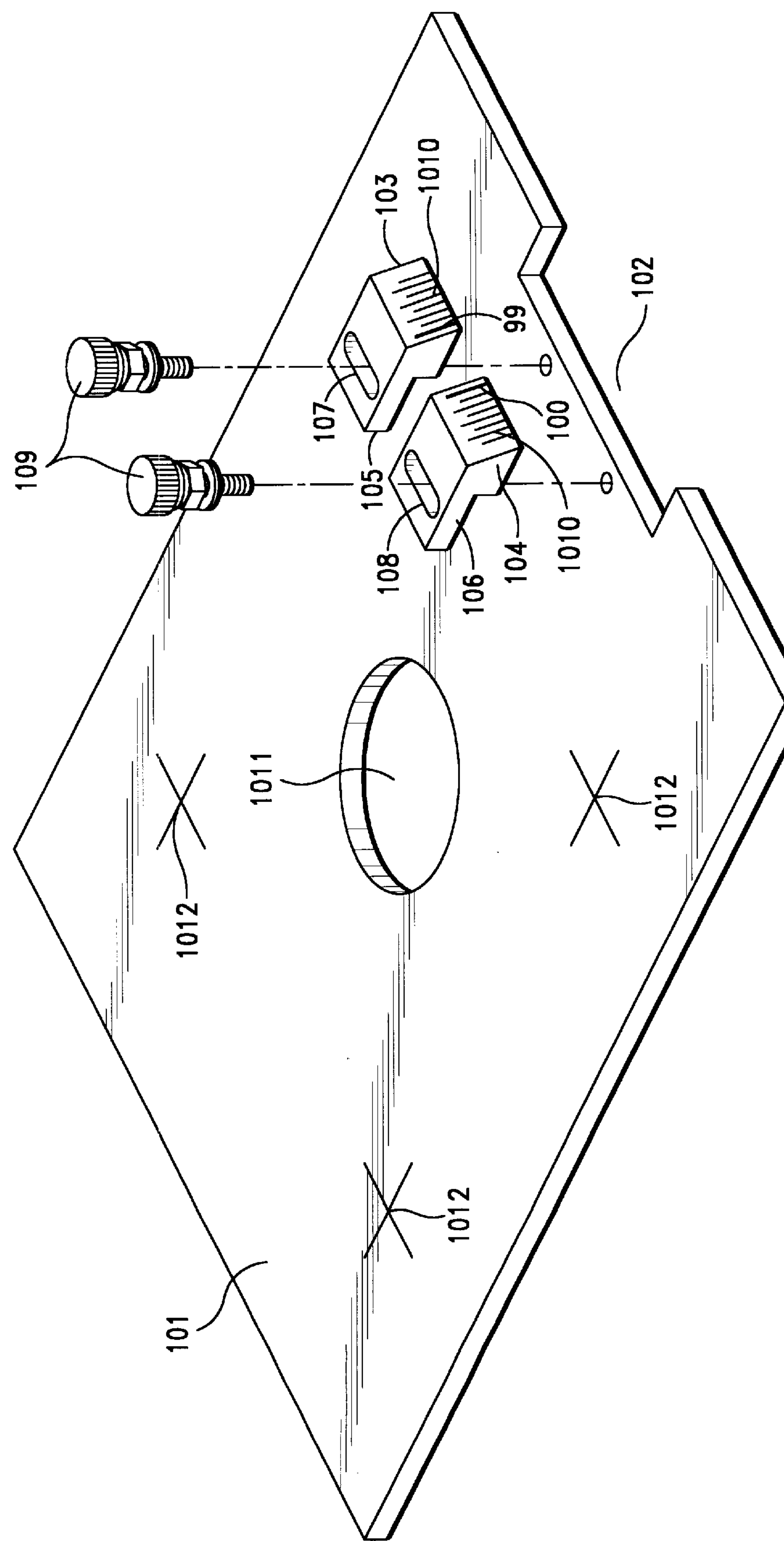
FIG. 1 is a perspective exploded view of the present invention showing the baseplate, cutout portion on front edge, indicator blocks with alignment and measuring indicators on front surface and means of attaching blocks to base.
Figure 2:
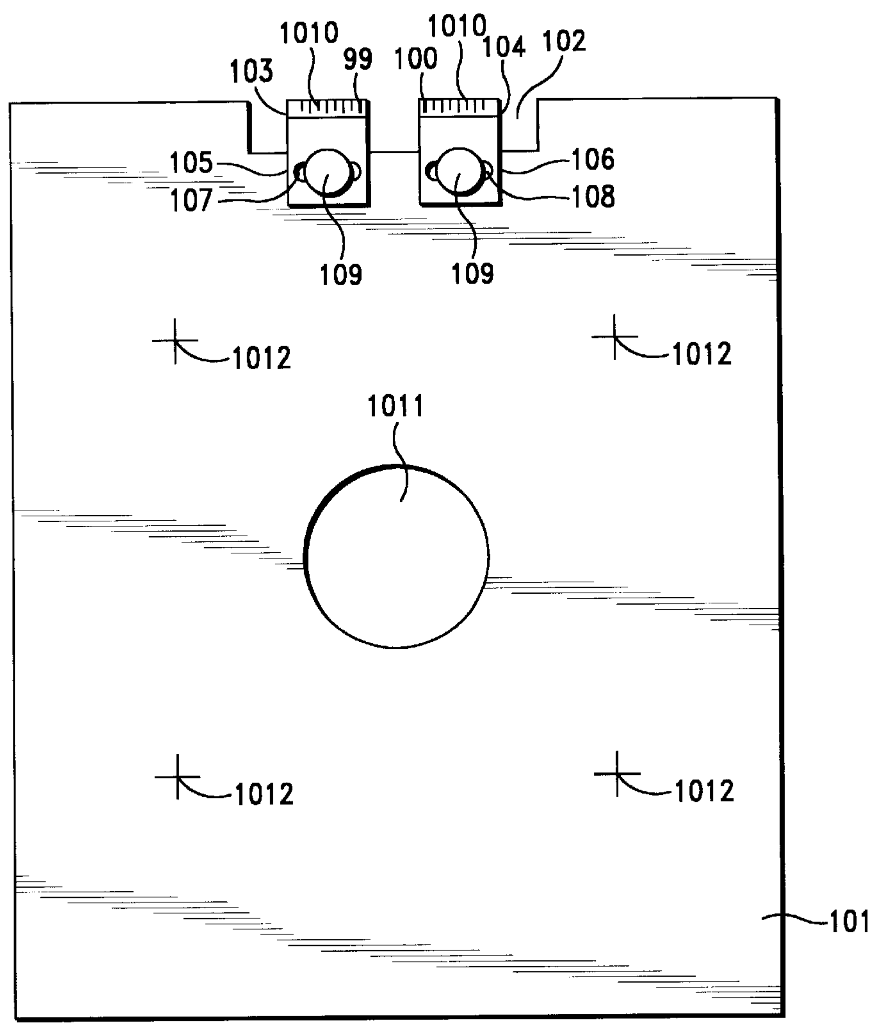
FIG. 2 is a top view of the present invention.

In the detailed description some like parts are purposely given different numbers in order to explain their purpose more fully. The drawings are not necessarily to scale. Referring to FIG. 2 the baseplate 101 is seen with multiply pierced holes 1012 for through passage of screws or bolts for attaching baseplate to bottom surface of router. Cutout portion 102 is seen containing left indicator block 103 with primary alignment indicator 99 and secondary measuring aligners 1010 on front surface. Rearward projection 105 has elongated slot 107 for passage through of thumbscrew 109. Cutout portion 102 also contains right indicator block 104 with primary alignment indicator 100 and secondary measuring aligners 1010 on front surface. Rearward projection 106 has elongated slot 108 for passage through of thumbscrew 109.

Figure 3:
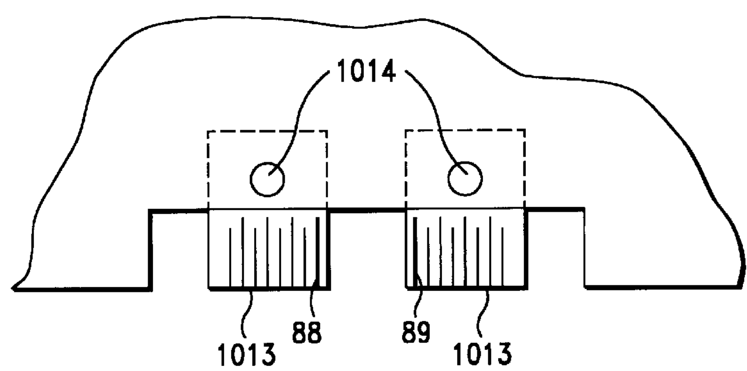
FIG. 3 is a cutaway view of baseplate in inverted position showing bottom view of indicator blocks.

FIG. 3 shows cutaway view of baseplate 101 inverted front to back as seen when mounted in a router table. Left primary alignment indicator 88 and secondary measuring indicators 1013 are shown, also threaded holes 1014 in baseplate 101 (FIG. 2) for engagement with thumbscrews 109 (FIG. 2) are seen.

In the cutting of a slot or groove or decorative cut the desired cutting tool is attached to the router outer with baseplate 101 attached and a piece of scrapwood are abutted to a guiding fence a reference cut is made. Maintaining the baseplate 101 and the scrapwood position abutted to the fence indicator blocks 103–104 are placed over reference cut. Thumbscrew 109 is loosened and left indicator block 103 is moved slidingly left to right in cutout portion 102 until left primary indicator 99 aligns precisely with left margin of reference cut. Left thumbscrew 109 passing through elongated slot 107 in rearward projection 105 threadedly engages hole 1014 (FIG. 3) and secures left indicator block 103 in this position. Right thumbscrew 109 is loosened and right indicator block is moved slidingly left to right in cutout portion 102 until right primary alignment indicator 100 aligns precisely with right margin of reference cut. Right thumbscrew 109 passing through elongated slot 108 in rearward projection 106 threadedly engages hole 1014 (FIG. 3) and secures right indicator block 104 in this position. The primary indicators 99–100 now precisely indicate the diameter or cutting margins of the installed cutting tool. Indicator blocks 103–104 are not moved again unless a different cutting tool is installed in router.

In a given example and assuming that a ¼ inch cutting tool is installed in the router and alignment indicators are set to cutting tool margins. The baseplate 101 is placed on the workpiece to precisely align the left primary alignment indicator 99 of left indicator block 103 with the left layout line of workpiece. A fence is abutted to the left edge of baseplate 101 and secured. As the primary alignment indicators 99–100 are set to the ¼ inch margins of the cutting tool the cut can be made.

To enlarge the cut without changing cutting tools, and assuming the desired enlargement is 1/16 inch on the left margin, the fence is loosened. With predetermined increments of 1/16 inch of the secondary alignment indicators 1010 the router is moved to the left until the first of the right secondary alignment indicators 1010 is precisely aligned with the right margin of the existing cut, the fence is abutted to the left edge of the workpiece and secured. When the cut is made it will remove exactly 1/16 inch from the left margin of the workpiece enlarging the cut to 5/16 inch. Using the same cutting tool, cut can be enlarged on either margin up to the capacity of the measuring alignment indicators 1010 using the above procedure.

In the inverted position the bottom primary alignment indicators 88–89 and the measuring alignment indicators, FIG. 3, will be on top. With the router held stationary in the router table the only procedural difference is the layout line of the workpiece is aligned to the right primary alignment indicator 89, the fence or guiding device is abutted to the right edge of the workpiece and secured. Cutting and/or enlargement procedures are based on moving the workpiece to alignment rather than moving the router.

What is claimed is:

1. A baseplate guide assembly for attachment to the underside of a router and adapted to give visual indication of exact diameter margins of a changeable cutting tool installed in said router and for precisely guiding said router along the diameter margins indicated, said baseplate assembly comprising:

a: a flat rigid generally rectangular plate member, larger than said underside of said router, said plate having on its front edge a laterally directed elongated cutout portion of predetermined dimensions, and a generally central opening for passage through of said changeable cutting tool;

b: adjustable left and right alignment indicating blocks, generally rectangular shaped and each having a laterally disposed through slot in a rearward projecting portion thereby adapting said indicating blocks to at least two surface contact with said plate member, c: each said indicating block having perpendicularly disposed scale indicia markings on its front edge, said scale indicia markings continuing rearwardly on its bottom surface, d: securing means in contact with the plate member for releasably securing said indicating blocks to selected, indicated positions relative to said diameter margins of said changeable installed cutting tool.

2. The baseplate guide assembly according to claim 1 wherein said at least two surface contact of said indicating blocks with said plate member limits said indicating blocks to lateral and medial sliding contact and containment within the cutout portion.

3. The baseplate guide assembly according to claim 1 wherein said scale indicia markings include a primary indicating marking and parallel multiple secondary measuring markings at predetermined spacings disposed lateral to said primary markings.

4. The baseplate guide assembly according to claim 3 wherein said primary indicating markings are changeable to relate to horizontal distance between said diameter margins of said changeable installed cutting tool.

5. The baseplate guide assembly according to claim 3 wherein said primary and said secondary scale indicia markings are visually apparent whether said baseplate guide is upright or inverted.

6. The baseplate guide assembly according to claim 1 wherein said releasable securing means include thumbscrews passing through said through slots in said rearward projections and threadedly engaging strategic receivers in the plate member, thereby releasably securing said indicator blocks to indicated positions relative to said margins of said installed cutting tool and enabling said baseplate attached router to precisely aligned visually to margins of desired cutaway area and to be accurately guided when making said cutaway procedure.

* * * * *